(12) United States Patent
Belknap et al.

(10) Patent No.: US 6,732,365 B2
(45) Date of Patent: May 4, 2004

(54) APPLICATION INTERFACE TO A MEDIA SERVER AND A METHOD OF IMPLEMENTING THE SAME

(75) Inventors: William Russell Belknap, San Jose, CA (US); Gerald Edward Kozina, Cupertino, CA (US); Tram Thi Mai Nguyen, San Jose, CA (US); Geroge Francis Silva, Watsonville, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/293,277

(22) Filed: Nov. 14, 2002

(65) Prior Publication Data

US 2003/0070001 A1 Apr. 10, 2003

Related U.S. Application Data

(62) Division of application No. 08/941,788, filed on Sep. 30, 1997, now Pat. No. 6,516,356.

(51) Int. Cl.[7] .................................................. G06F 9/54
(52) U.S. Cl. ..................... 719/328; 719/322; 709/203; 709/217; 709/219; 709/231
(58) Field of Search ................... 709/321–328, 709/203, 217, 219, 231; 717/136–138; 719/321–328

(56) References Cited

U.S. PATENT DOCUMENTS 4,124,889 A  11/1978  Kaufman et al.
4,800,523 A   1/1989  Gerety et al.

(List continued on next page.)

FOREIGN PATENT DOCUMENTS

EP          0259659      3/1988
GB          2 273 020 A  6/1994

(List continued on next page.)

OTHER PUBLICATIONS

Gibbs et al., "Multimedia Servers", Oracle Magazine, Fall 1993, pp(5).*

(List continued on next page.)

Primary Examiner—St. John Courtenay, III

(57) ABSTRACT

According to the present invention, a media manager is provided which incorporates an application program interface (API) for converting high-level generic commands into device-level commands for output to a media device. The inventive media manager includes a high-level command processor which decodes the high-level generic commands and device-specific code mapping modules which convert the high-level generic commands decoded by the high-level command processor into device-level commands. Each of the device-level commands is output from one of the device-specific code-mapping modules to a corresponding one of the media devices. The present invention also encompasses a method of implementing an application program interface (API) for media devices. The method includes receiving high-level generic commands from a computer application, converting the high-level generic commands into device-level commands, and outputting each of the device-level commands to one of the media devices. The present invention also encompasses a computer program product including a computer-readable medium. The computer program product includes means for decoding high-level generic commands, means for converting the high-level generic commands into device-level commands, and means for outputting each of the device-level commands to a corresponding one of the media devices. The present invention further encompasses a common application program interface (API) which converts high-level generic commands received from a computer application into device-level commands which are output to a plurality of media devices including media servers which stores media objects. The common API includes a plurality of individual APIs which each perform a specific function.

14 Claims, 4 Drawing Sheets

U.S. PATENT DOCUMENTS

| | | | |
|---|---|---|---|
| 5,307,456 A * | 4/1994 | MacKay | 345/782 |
| 5,499,343 A | 3/1996 | Pettus | |
| 5,544,318 A | 8/1996 | Schmitz et al. | |
| 5,604,843 A | 2/1997 | Shaw et al. | |
| 5,642,171 A | 6/1997 | Baumgartner et al. | |
| 5,668,948 A | 9/1997 | Belknap et al. | |
| 5,752,159 A | 5/1998 | Faust et al. | |
| 5,790,176 A | 8/1998 | Craig | |
| 5,805,796 A | 9/1998 | Finch et al. | |
| 5,805,821 A | 9/1998 | Saxena et al. | |
| 5,813,014 A | 9/1998 | Gustman | |
| 5,826,085 A | 10/1998 | Bennett et al. | |
| 5,907,704 A | 5/1999 | Gudmundson et al. | |
| 5,926,649 A | 7/1999 | Ma et al. | |
| 6,023,731 A | 2/2000 | Chawla | |
| 6,038,611 A | 3/2000 | Masel | |
| 6,044,408 A | 3/2000 | Engstrom et al. | |
| 6,064,379 A | 5/2000 | DeMoney | |
| 6,078,942 A | 6/2000 | Eisler et al. | |
| 6,108,695 A | 8/2000 | Chawla | |
| 6,199,060 B1 * | 3/2001 | Gustman | 707/3 |
| 6,253,257 B1 | 6/2001 | Dundon | |
| 6,256,678 B1 | 7/2001 | Traughber et al. | |
| 6,360,368 B1 | 3/2002 | Chawla | |
| 6,477,537 B2 * | 11/2002 | Gustman | 707/102 |

FOREIGN PATENT DOCUMENTS

| | | |
|---|---|---|
| JP | 06-243075 | 9/1994 |
| JP | 07-064893 | 3/1995 |
| JP | 09-114759 | 5/1997 |

OTHER PUBLICATIONS

Gemmell et al., "Multimedia Storage Servers: A Tutorial", IEEE Computer, May 1995 pp(15).*

Aldred et al An Architecture for Multimedia Communication and Real–Time Collaboration;., IBM Systems Journal—vol. 34, No. 3, 1995.

Musser, "A multimedia class library for Windows", Dr. Dobb's Journal on CD–ROM, Jul. 1993.

Multimedia Programming Interface and Data Specification 1.0 Issued as a Joint Design by IBM Corporation and Microsoft Corporation, Aug. 1991; http://ww.seanet.com/users/matts/riffmci/riffmci.htm; pp. 1–91.

Gibbs et al., Multimedia Servers by Gibbs, et al. Oracle Magazine; Fall 1993.

Leah–Martin, General Magic Integrates Magic Cap With Oracle; Media Server; Oracle Magazine; Spring 1994.

Henderson, The Price of Pretty Pictures; LAN Magazine—Interoperability, Nov. 1995.

http://www.zdwebopedia.com/TERM/s/server.html; Mar. 20, 2001.

* cited by examiner

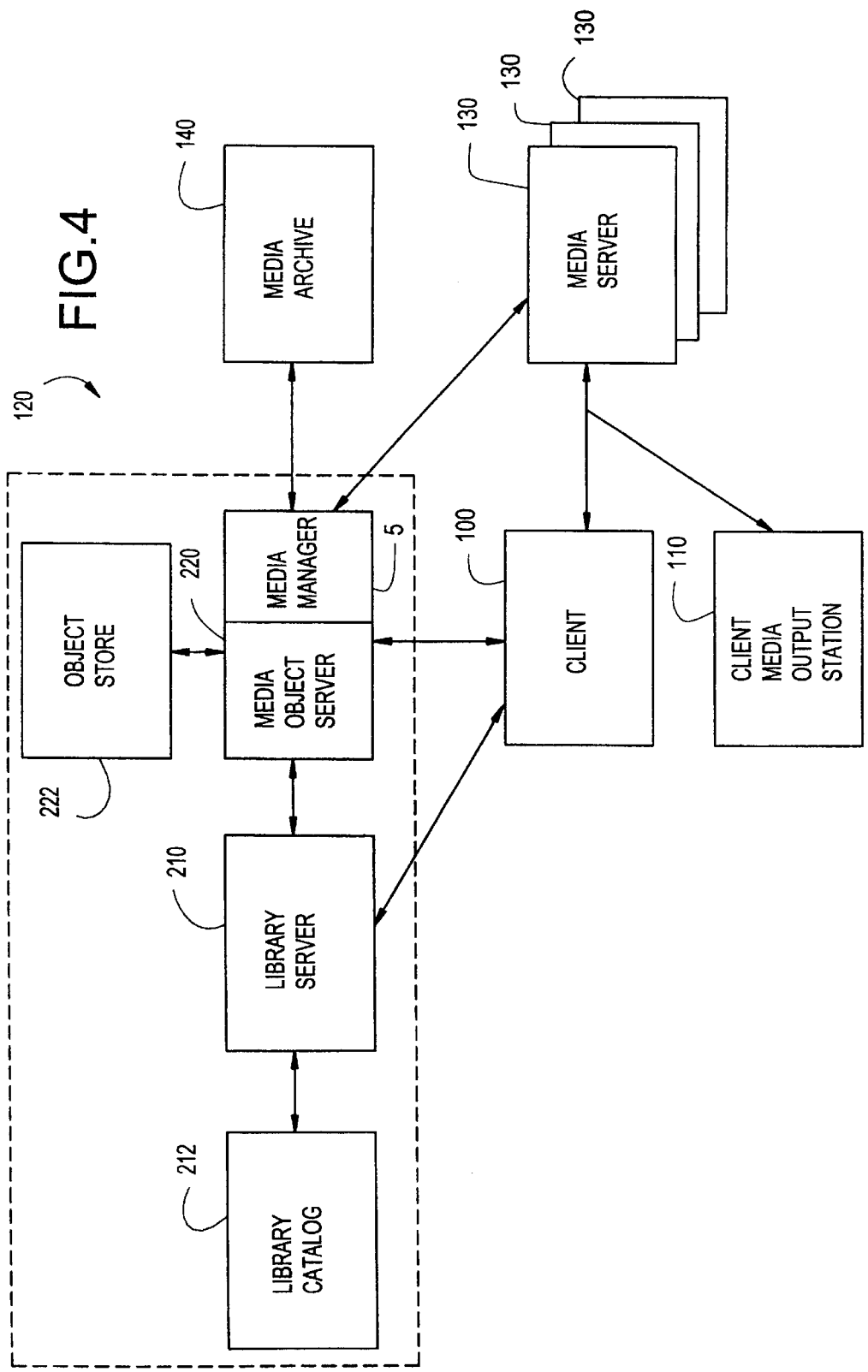

APPLICATION INTERFACE TO A MEDIA SERVER AND A METHOD OF IMPLEMENTING THE SAME

This is a divisional of Application No. 08/941,788 filed Sep. 30, 1997; now U.S. Pat. 6,516,356 the disclosure of which is incorporated herein by reference.

BACKGROUND OF THE INVENTION

1. Field of the Invention

The present invention relates to an application interface, and more particularly to an application interface to a media server and a method of implementing the same.

2. Description of the Related Art

Conventional multimedia data storage systems are often employed to retain large amounts of multimedia data which are made available for multimedia applications. These conventional multimedia data storage systems may also incorporate a digital library, such as that which is described in U.S. Pat. No. 5,649,185 to Antognini et al. A problem that arises with conventional multimedia data storage systems stems from the fact that they often employ multiple media servers which deliver specific types of data to a client media output station such as a client viewer including a display. However, because each media server supports only its own device-level commands, it is difficult for applications running within the conventional multimedia data storage system to interact with multiple media servers. Accordingly, each application communicating with a particular media server must take into account the unique characteristics of that media server. However, such a scheme can become burdensome when there are numerous media servers. Moreover, such a scheme requires that applications be continuously updated when new media servers are incorporated into the multimedia data storage system.

SUMMARY OF THE INVENTION

It is an object of the present invention to provide a robust management scheme which provides a common interface to media servers.

It is another object of the present invention to provide a common interface to media servers which conceals the media server specific device commands from applications which interact with the media servers included within the system.

To achieve the above-mentioned objectives of the present invention, a media manager is provided which incorporates an application program interface (API) for converting high-level generic commands into device level commands for output to a plurality of media devices. The inventive media manager includes a high-level command processor which decodes the high-level generic commands, and a plurality of device specific code mapping modules which convert the high-level generic commands decoded by the high-level command processor into device-level commands. Each of the device-level commands is output from one of the plurality of device specific code mapping modules to a corresponding one of the plurality of media devices.

The present invention also encompasses a method of implementing an application program interface (API) for a plurality of media devices. The method includes receiving a plurality of high-level generic commands from a computer application, converting the plurality of high-level generic commands into device-level commands, and outputting each of the device-level commands to one of the plurality of media devices.

The present invention also encompasses a computer program product including a computer-readable medium. The computer program product includes means for decoding a high-level generic command, means for converting the high-level generic command into one or more device level command, and means for outputting the converted device level commands to a corresponding one of the plurality of media devices.

The present invention further encompasses a common application program interface (API) which converts a high-level generic command received from a computer application into one or more device-level commands which are output to a plurality of media devices including media servers which store media objects. The common API includes a plurality of individual APIs which each perform a specific function.

According to one aspect of the invention, the plurality of individual APIs comprise first and second groups of individual APIs. The first group of the individual APIs corresponds to a first group of member functions associated with a class defining objects which represent media servers. The second group of the individual APIs corresponds to a second group of member functions associated with a class defining objects which represent a logical description of a physical format of media objects.

BRIEF DESCRIPTION OF THE DRAWINGS

The above objects and advantages of the present invention will become more apparent by describing in detail preferred embodiments thereof with reference to the attached drawings in which:

FIG. 4 shows the elements of the multimedia data storage system shown in FIG. 3.

DETAILED DESCRIPTION OF THE INVENTION

The present invention is directed to a media manager, which is preferably implemented in a multimedia data storage system, that provides a common application program interface to media servers included within the system. The media manager incorporates a management scheme which facilitates communication between applications running within the multimedia data storage system and the media device(s).

Figure 1:
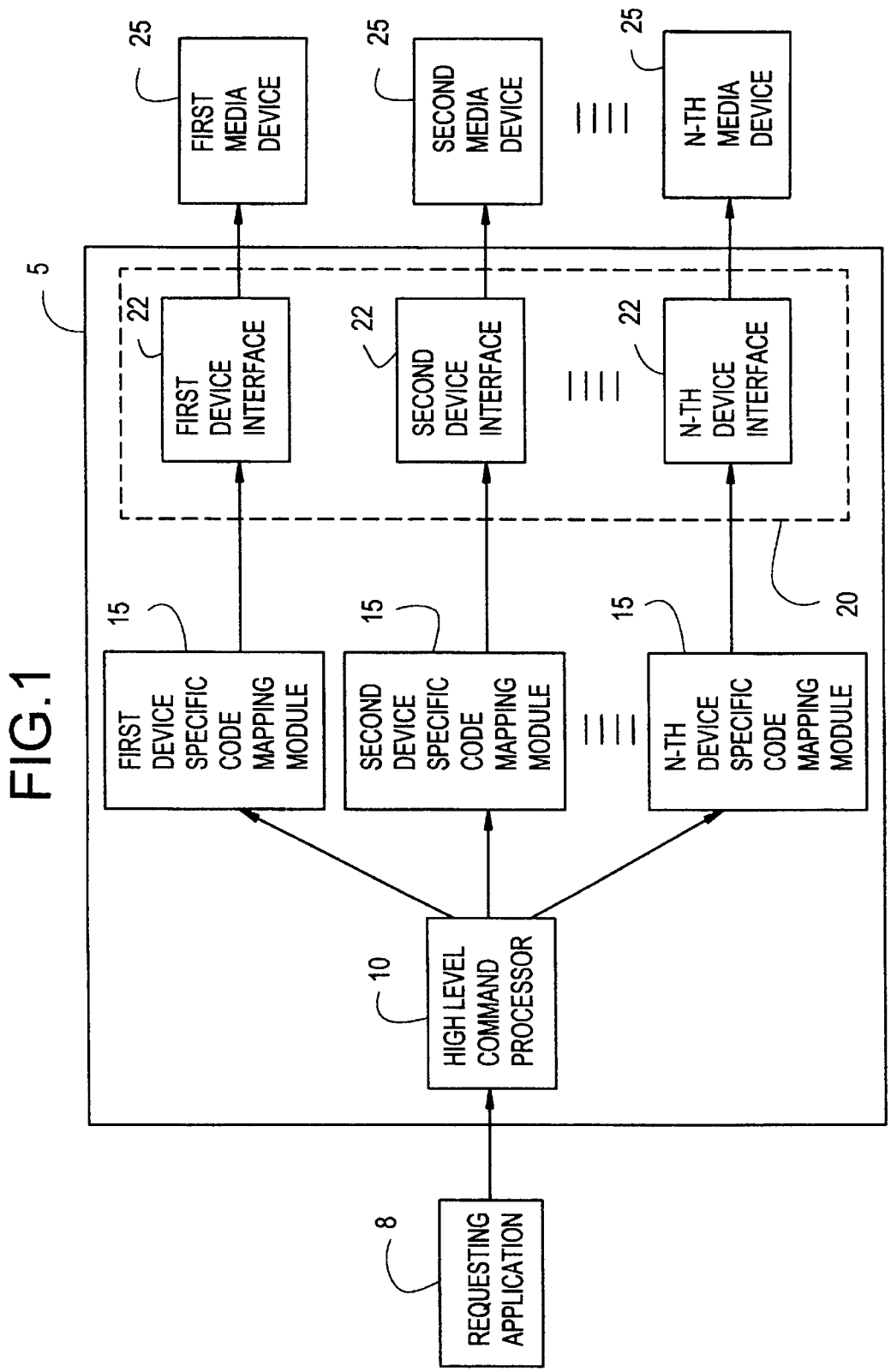
FIG. 1 shows a media manager which incorporates the common application program interface (API) of the present invention.

FIG. 1 depicts a media manager 5 which receives high-level commands from a requesting application 8. The media manager 5 converts the high-level commands into device specific commands which are output to first through N-TH media devices 25, which may be a media archive or a media server for handling specific types of media data such as video or audio data. Using the media manager 5, the requesting application 8 can request that a specific function be performed by the media devices 25 without having to take into account the idiosyncracies of those media devices 25. In addition, the media manager 5 also shields the requesting application 8 from having to account for internal changes to the media devices 25.

The media manager 5 includes a high-level command processor 10 which receives the high-level commands from the requesting application 8 and identifies whether a command corresponds to a particular type of media server which the media manager 5 supports. If the high-level command processor 10 determines that the command issued by the requesting application 8 corresponds to a media device 25 supported by the media manager 5, the processor 10 passes the request to a device-specific code-mapping module 15 which handles the high-level commands destined for that media device 25.

The device specific code mapping module 15 will map each high-level command into a device-level command for the module's corresponding media device 25 and transfer the device-level command to the media device 25 via a device interface 20 which includes multiple device level interfaces 22. Alternatively, the device-specific code-mapping module 15 will convert each high-level command into a series of actions, which may correspond to at least one of the above-mentioned high-level commands. These actions are then converted into device-level commands by the device-specific code-mapping module 15 for the corresponding media device 25.

The media manager 5 may include multiple device-specific code-mapping modules 15 in order to support more than one type of media device 25. Accordingly, the media manager 5 includes first through N-TH device-specific code-mapping modules 15 in order to support the first through N-TH media devices 25.

The media manager 5 preferably is implemented with the common application program interface (API) of the present invention. However, the high-level command processor 10 actually supports a number of individual APIs which together constitute the common API of the present invention. The media manger 5 may be implemented in software which is stored in machine readable from on, for example, a computer-readable disk.

The individual APIs correspond to member functions of at least two classes. The first class, SERVER, defines objects which represent the media servers 130 shown in FIG. 3. However, the SERVER class may be derived from a third class, MEDIA_DEVICE, in order to accommodate both media servers and media archives. Thus, a fourth class, ARCHIVE, may be provided which defines objects that represent the media archives 140. However, discussion of the ARCHIVE class is omitted because the member functions which make up the class are similar to those provided in the SERVER class. A discussion of a media archive can be found in U.S. Application, entitled "A MULTIMEDIA DATA STORAGE SYSTEM INCLUDING A MEDIA SERVER AND MEDIA ARCHIVE AND A METHOD OF MANAGING THE MEDIA SERVER AS A CACHE DEVICE FOR THE MEDIA ARCHIVE", which is incorporated herein by reference and filed concurrently with the present application.

The second class, CONTENT, defines objects which represent a logical description of the physical format of an object or part thereof. By way of example, objects with the same format may share a CONTENT class. The requesting application can interact with any of the media devices 25 via the member functions of the CONTENT class in order to acquire information about objects stored within those media devices 25.

The above-mentioned member functions are described in greater detail in the attached TABLE. The individual APIs which incorporate those member functions are described in detail below.

Server Application Program Interfaces

A CLOSE API is provided in order to close an open media object. In addition, the CLOSE API destroys an instance of the CONTENT class.

A CLOSE_SESSION API is provided in order to close an open session. All resources allocated to the session will be released with the use of the CLOSE_SESSION API.

A COPY_MEDIA API is provided to copy a media object from one server to one or more other servers.

A DELETE API is provided in order to remove a media object from the server subsystem.

An EVENT_HANDLER API is provided to conditionally receive control for asynchronous events. An event mask, set with a REGISTER_CALL_BACK API, allows the specification of events to be passed to the EVENT_HANDLER API.

An EVENT_MASK API is provided to return the current event mask.

A GET_META_DATA API is provided to build and return a meta data file.

A GET_MEDIA_STATUS API is provided to obtain the status of a media object.

An INIT_SERVER API is provided to initialize a media manager client library. However, the INIT_SERVER API must be the first API that the requesting application calls before requesting another media manager service.

A LIST_MEDIA_GROUPS API is provided to obtain a list of configured media group names.

A LIST_MEDIA_NAMES API is provided to obtain a list of names of media objects associated with a particular media group of media objects.

An OPEN API is provided to return an instance of the CONTENT class that is used in subsequent calls to read or write data from or to a media object.

An OPEN_SESSION API is provided to open a session from the application to the video server subsystem.

A REGISTER_CALL_BACK API is provided to register the EVENT_HANDLER API with the Media Manager library. Once registered, the application may receive asynchronous event notification from the media device when necessary.

A C_SERVER API is provided as a constructor to create an instance of the SERVER class for a specific media server type.

A D_SERVER API is provided as a default destructor to destroy an instance of the SERVER class for a specific media server type.

An UN_REGISTER_CALL_BACK API is used to un-register the application event handler. When the event handler is unregistered, the application will not receive asynchronous event notifications.

Content Application Program Interfaces

A DESTAGE API is provided to destage (i.e. transfer) a media object from a media server to a media archive.

A GET_MEDIA_ATTRIBUTE API is provided to obtain the media attributes of a media object.

A GET_MEDIA_STATUS API is provided to obtain the status of a media object.

A LOAD API is provided to copy an existing media object to a media device. The media object must be open in write mode. The LOAD API is asynchronous in nature (i.e. it returns after initiating the load operation). The progress of the load function can be determined by calling the GET_MEDIA_STATUS API. In addition, an invocation of the LOAD API may be cancelled by using the CLOSE API.

A READ API is provided to read data of the media object. Each successive use of the READ API reads a sequential number of bytes from a current position within the media object. The media object must be open to invoke the READ API.

A RETRIEVE API is provided to retrieve a media object from a media server. The RETRIEVE API is used in conjunction with the GET_META_DATA API.

A SEEK API is provided to set the current byte position within the media object. However, the SEEK API can only be used in conjunction with the READ API. Therefore, it cannot be used in conjunction with the WRITE API described below. In addition, the media object must be open in read mode.

A SET_MEDIA_ATTRIBUTES API is provided to set the media attributes of a media object. However, to invoke the SET_MEDIA_ATTRIBUTES API, the media object must be opened in write mode.

A WRITE API is used to write data to the media object. Each successive use of the WRITE API writes a sequential number of bytes to the media object. However, the media object must be open to use the WRITE API.

Depending on the type of media device employed, some of the individual APIs described above may need to be converted into a number of actions which may include the use of some of the other individual APIs mentioned above. By way of example, the LOAD API may be converted into a group of actions which require the use of the OPEN API, the COPY_MEDIA API, the SET_MEDIA_ATTRIBUTE API and the CLOSE API. The group of actions would then be converted into corresponding device level commands corresponding to a particular media device 25. Depending on the particular hardware implementation of the media device 25, these device level commands may correspond, one-to-one, to the individual APIs mentioned above in connection with the group of actions. Accordingly, device level commands associated with the LOAD API may include an OPEN command, a COPY command, at least one SET_ATTRIBUTES command and a CLOSE command which correspond to the individual APIs mentioned above.

Figure 2:
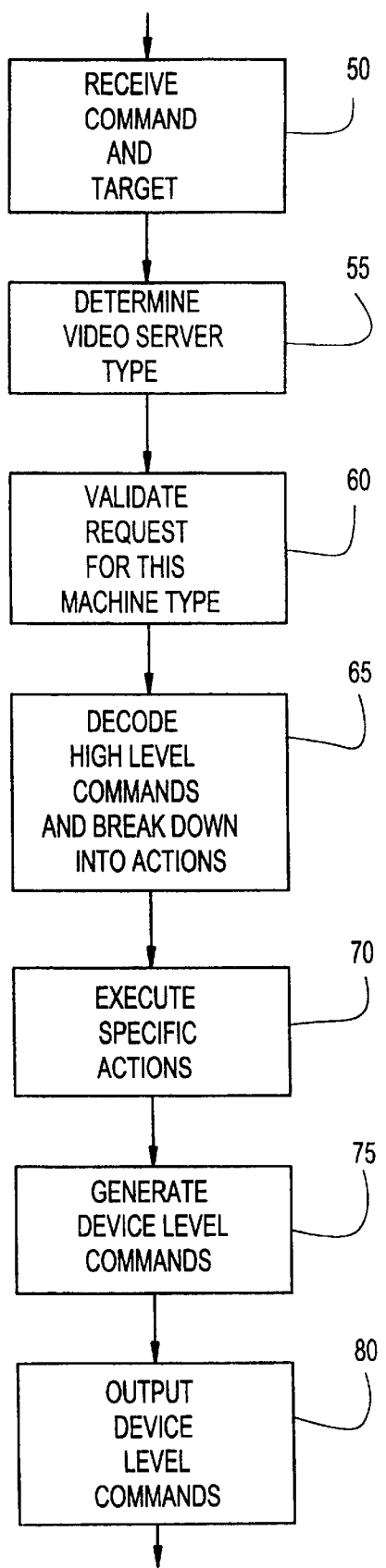
FIG. 2 shows a flow chart diagram related to the operation of the inventive media manager.

The operation of the media manager 5 will now be discussed in connection with FIG. 2. In step 50, a high-level command is received by the media manager 5 from the requesting application 8 along with a target media device. Thereafter, in step 55, the video server type is determined by the high-level command processor 10 of the media manager 5 based on the information provided by the requesting application 8. Subsequently, in step 60, the request for the specific machine type is validated by the high-level command processor 10.

In step 60, the high-level commands are decoded and broken down into specific actions by the high-level command processor 10. In step 70, the specific actions are executed. Thereafter, in step 75, the device-level commands can be generated from the specific actions by one of the device-specific code-mapping modules 15. Then, in step 80, the device-level commands are output via the device interface 20 to a corresponding media device 25.

Figure 3:
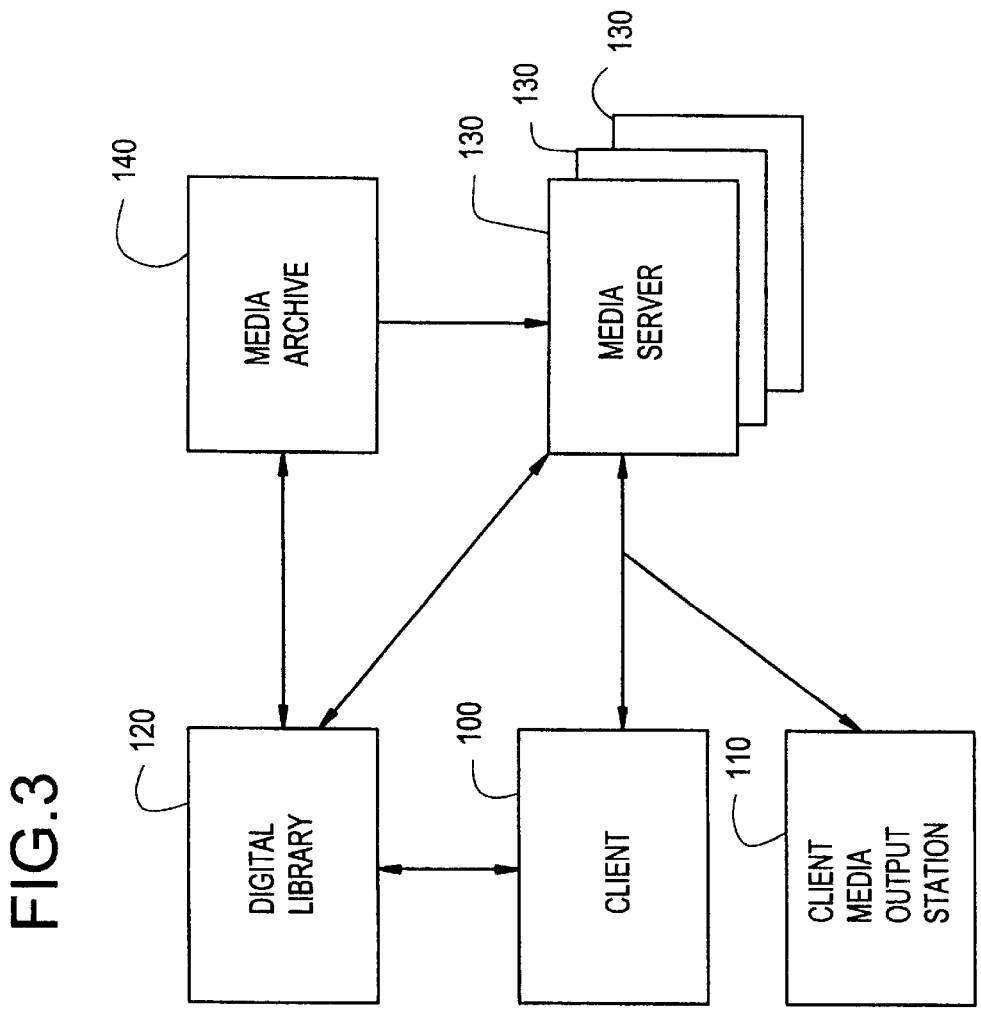
FIG. 3 shows a multimedia data storage system incorporating the inventive media manager.

An exemplary multimedia data storage system which incorporates the inventive media manager shown in FIG. 1 is described below with reference to FIGS. 3 and 4 in which the common API of the present invention is used in a digital library environment. The multimedia data storage system includes a library client 100, a client media output station 110, a digital library 120, media servers 130 and a media archive 140 which are implemented in a computer based system. The relationship between the client 100 and the digital library 120 is explained in greater detail below with reference to FIG. 4 which also shows the internal elements of the digital library 120. The internal structure of the digital library 120 is further described in U.S. Pat. No. Ser. 5,649,185, as noted above.

As shown in FIG. 4, the digital library 120 includes a library server 210 and at least one media object server 220 which interact with the library client 100. In addition, a communications isolator is provided in the digital library which allows the library server 210, the media object server 220 and the library client 100 to communicate with one another without concern for complex communications protocols. The library server 210, the media object server 220 and the library client 100 are connected by a communications network, such as a local area network (LAN) or a wide area network (WAN).

Although the media object server 220 and the client 100 output commands to the media server 130 generated by applications running on those platforms, those commands must be converted to device-level commands in order to control the particular media server 130 receiving them. Accordingly, the commands are transferred to the media server 130 via a common API which is incorporated in the media manager 5. Although the media manager 5 is shown in FIG. 4 as being included in the media object server 220, the media manager 5 may be included in the media servers 130.

As noted above, the common application program interface allows the media object server 220 to interact with media servers 130 having different operational characteristics. The interface achieves this objective by translating the generic instructions or commands generated by applications running on the media object server 220 or client 100 into specific actions that are mapped to device-level commands which are output to a particular media server 130. Thus, the common application program interface ensures that applications need not account for the idiosyncrasies of a particular media server 130 in order to generate commands for that media server 130.

In addition, as noted above, applications can interact with each of the media servers 130 via the member functions of the CONTENT class in order to acquire information about objects stored within those media servers 130.

The above-mentioned individual APIs will usually be used in conjunction with a request, which is sent by the library client 100 to the library server 210, to store, retrieve, and update media objects. The storage, retrieval and updating of media objects within the multimedia data storage system is described in greater detail below.

When a request to retrieve or update a particular media object is generated by the library client 100, the library server 210 determines whether the media object is located within the multimedia data storage system by searching an index of media objects stored within the system.

Once the library server 210 determines that the media object is stored within the multimedia data storage system, it passes the request to that media object server 220 which retains control over the physical location of the media object. The media object may be stored in the media object server 220 itself, or in the media servers 130 or the media archive 140 associated with the media object server 220. Thereafter, the library server 210 may update the media object indexes and descriptive information stored in the library catalog 212 to which the library server 220 is connected to reflect the request.

After receiving the request to retrieve or update the media object, the media object server 220 identifies the specific type of media object (i.e. audio or video based file) based on an identifier included in the request. Thereafter, the object server 220 will identify whether the media object is located locally within the object store 222 or at a remote location within the media archive 140 or one of the media servers 130.

If the media object server 220 determines that the media object is located in the media archive 140, then depending on the type of the media object, the media object server 220 will output a command via the media manager 5 to the media archive 140 which instructs the media archive 140 to transfer the media object to the appropriate media server 130.

Thereafter, the media server 130 receiving the media object will output the same to the client media output station 110 upon receipt of a command to do so from the media object server 220 via the media manager 5. By way of example, the client media output station 110 may be a video display such as a television, broadcast monitor or a computer monitor including a CRT tube or flat panel display.

In an alternative scheme, once the media object is stored in the media server 130, the media object server 220 passes control information concerning the media object to the client 100, which then commands the media server 130 via the media manager 5 to output the media object to the client media output station 110. By way of example, the media object may be output as an asynchronous transfer mode (ATM) based video stream. In addition, the client media output station 110 may be separate from, or included within the client 100.

If the client 100 requests that a media object be stored or loaded into the multimedia data storage system, then the library server 210 catalogs indexing information concerning the media object. Subsequently, the library server 210 will request that the object server 220 store control information corresponding to the media object. Thereafter, the media object server 220 issues a command via the media manger 5 to the media server 130. In response to the command, the media server 130 will load the media object into itself from the client 100. The client 100 will then transfer the media object to the media server 130 completing the loading process.

Although the above-mentioned multimedia data storage system was described in connection with a digital library, the media management scheme of the present invention may be employed in a multimedia data storage system which is configured differently. In addition, other modifications and variations to the inventive media management scheme will be apparent to those skilled in the art from the foregoing disclosure and teachings. Thus, while only certain embodiments of the invention have been specifically described herein, it will be apparent that numerous modifications may be made thereto without departing from the spirit and scope of the invention.

Server Class Member Functions
Close
  Closes an open media object and destroys a CONTENT class instance.
  Parameters:
  An indicator of an instance of the CONTENT class.
  Return Codes:
  A first code indicates whether the operation was performed successfully.
  A second code indicates whether the media server reported an error.
  A third code indicates whether the operation failed.
Close_Session
  Closes an open session. All resources allocated to the session will be released.
  Parameters:
  None
  Return Codes:
  A first code indicates that the operation was successfully completed.
  A second code indicates that the media server reported an error.
  A third code indicates that an invalid media group was specified.
  A fourth code indicates that the media server cannot be located.
  A fifth code indicates that the operation failed.
Copy_Media
  Copies a media object from one media server to one or more other media servers.
  Due to the length of time that a copy operation may take, the COPY_MEDIA member function method works asynchronously. That is, it is returned after initiating the copy operation. The progress of the copy operation may be determined by calling the GET_MEDIA_STATUS member function. The copy operation may be cancelled by calling the CLOSE member function.
  Parameters:
  An indicator of a media name.
  An indicator of a byte offset, at which to begin the copy operation.
  An indicator of a byte offset, at which to end copy operations. A zero value can be specified to indicate the end of the media object.
  An indicator of an array of MEDIA_LOCATION structures. Each MEDIA_LOCATION structure specifies one target location for a particular copy operation. The MEDIA_LOCATION structure indicates the size of the structure, the number of users, the media server name, the media group name, and the media object name.
  A number of locations to which a media object will be copied.
  An indicator of a CONTENT instance pointer.
  Return Codes:
  A first code indicates that the operation was successfully performed.
  A second code indicates that the media server reported an error.
  A third code indicates that the media name is invalid.
  A fourth code indicates that an invalid media group (i.e. group of media objects) has been specified.
  A fifth code indicates that a specified media name cannot be found.
  A sixth code indicates that a copy operation has failed.
Delete
  Removes an media object from the media server.
  Parameters:
  An indicator of a media name.
  A condition for deleting the media object. By way of example, this parameter may specify that the media object is to be deleted only if all of the resources are inactive.
  Alternatively, this parameter may mark the asset as unavailable, and defer deletion until media object is no longer in use.
  Return Codes:
  A first code indicates that the operation was performed successfully.

A second code indicates that the media server reported an error.

A third code indicates that the specified media name was not found.

A fourth code indicates that the specified media object is in use.

A fifth code indicates that the specified media name is invalid.

A sixth code indicates that delete operation has failed.

Event_Handler

Conditionally receives control for asynchronous events. An event mask, set with the REGISTER_CALL_BACK member function, allows specified events to be passed to the EVENT_HANDLER member function.

Parameters:

An indicator of an event structure.

By way of example, the event structure may specify the size of the event structure, an event type, a media event, and an error event. The media event structure specifies an indicator of the CONTENT class, an event type, an index into a specific location or file array. The error event structure specifies the specific event associated with the occurrence of an error.

Events are asynchronous messages sent to the media manager by the media server.

Return Codes:

This member function has no return type.

Get_Event_Mask

Returns the current event mask.

Parameters:

An indicator of an event mask.

Return Codes

A first code indicates that the operation was successfully completed.

A second code indicates that the event mask is not defined.

Get_Meta_Data

Builds and returns a metadata file.

Parameters:

An indicator of a media name.

A value which indicates whether playback should begin automatically, or delayed until play action.

A size of user data.

An indicator of a user defined data value.

An indicator of a MEDIA_STATUS structure to receive status information. The MEDIA_STATUS structure specifies the size of the structure, the current length (bytes), the media copy rate, a media open mode, a creation date, the date of the most recent modification, and the date of the most recent access.

An indicator of a buffer to receive metadata information.

The size of buffer.

Return Codes:

A first code indicates whether the operation was successfully performed.

A second code indicates that the media server reported an error.

A third code indicates whether the specified media name is invalid.

A fourth code indicates whether the specified media name is valid.

A fifth code indicates that a specified media name was not found.

A sixth code indicates that the operation has failed.

A seventh code indicates that there is insufficient disk bandwidth for the operation.

An eighth code indicates that an invalid media group has been specified.

A ninth code indicates that the operation is not available on the media server specified.

Get_Media_Status

Obtains the status of a media object.

Parameters:

An indicator of a media name.

An indicator of a MEDIA_STATUS structure which is used to receive status information. The MEDIA_STATUS structure specifies the size of the structure, a current length in bytes of the media object, a media copy rate, a media open mode, the creation date of the media object, the last modification date of the media object, and the last access date of the media object.

Return Codes:

A first code indicates whether the operation was successfully completed.

A second code indicates whether the media server reported an error.

A third code indicates whether the specified media name is invalid.

A fourth code indicates whether the operation has failed.

Init_Server

Initializes the Media Manager client library. This member function has to be the first call the application issues before requesting other Media Manager services.

Parameters:

The maximum number of sessions to be supported by the Media Manager.

An indicator of a current version.

Return Codes:

A first code indicates whether the operation was performed successfully.

A second code indicates that no more resources are available.

A third code indicates that the operation has failed.

List_Media_Groups

Obtains a list of configured media group names.

Parameters:

An indicator of an array of MEDIA_GROUP_ATTRIBUTES structures that will specify the media group name and type. A media group name is a variable-length string. The media group type includes default and current media groups.

An indicator of the size in bytes of a group array.

Return Codes:

A first code indicates that the operation was successfully completed.

A second code indicates that the media server has reported an error.

A third code indicates that the media server cannot be located.

A fourth code indicates that the operation has failed.

List_Media_Names

Obtains a list of media names associated with a media group.

Parameters:

An indicator of a media group name.

An indicator which specifies a buffer of media names. Each media name in the buffer is a variable length string.

An indicator of the number of entries returned in the buffer. an indicator of the buffer size.

An indicator of a position that is the start of a list of media names.

Return Codes:

A first code indicates that the operation was successfully completed.

A second code indicates that the media server has reported an error.

A third code indicates that the operation has failed.

Open

Returns an instance of the CONTENT class that is used in subsequent calls to read or write data from or to a media object.

Parameters:

An indicator of a media name.

A mode of operation which corresponds to a read or write mode of operation. There are several options which can be specified along with this parameter. Namely, an indication can be provided of whether the media object is provided for exclusive use. An indication can also be provided that the media object should be created if it does not already exist. An indication can also be provided of whether content should be truncated from the media object. In addition, an indicator can be provided of the location of the end of the media object. The rate in bits per second that the media object will be read from or written to.

A location of a pointer to an instance of the CONTENT class.

Return Codes:

A first code indicates that the operation was successfully completed.

A second code indicates that the media server has reported an error.

A third code indicates that the specified media name was not found.

A fourth code indicates that an invalid mode was specified.

A fifth code indicates that an invalid copy-rate was specified.

A sixth code indicates that a media object cannot be shared.

A seventh code indicates that a request for exclusive use is denied, because a particular media object is in use.

An eighth code indicates that a media name already exists.

A ninth code indicates that the operation has failed.

Open_Session

Opens a session from the application to the media server.

Parameters:

A host name of a media server with which to establish a session.

A name of a media group.

Return Codes:

A first code indicates that the operation was successfully completed.

A second code indicates that the media server has reported an error.

A third code indicates that the operation has failed.

A fourth code indicates that the media server cannot be located.

A fifth code indicates that an invalid media group has been specified.

A sixth code indicates that an invalid server name has been specified.

Register_Call_Back

Registers the application event handler with the media manager. Once registered, the application may receive asynchronous event notification from the media server when necessary.

Parameters:

An event mask (i.e. bit mask) which is used to select which events are to be sent to the EVENT_HANDLER method function.

The event mask is developed using a logical operation involving the following event masks. A first event mask indicates a change in the state of a port. A second event mask indicates a change in the state of a media object. A third event mask indicates that an error has occurred.

A fourth event mask indicates a change in the state of a media stream.

A fourth event mask indicates a report of an event.

Return Codes:

A first code indicates that the operation was successfully completed.

A second code indicates that the media server has reported an error.

A third code indicates that an invalid event type has been specified.

A fourth code indicates that the operation has failed.

C_Server

Acts as a constructor which creates an instance of the SERVER class for a specific media server type.

Parameters:

A support level to be created within a SERVER class instance.

Return Codes:

None

D_Server

Acts as a destructor with respect to an instance of the SERVER class.

Parameters:

None

Return Codes:

None

Un_Register_Call_Back

Unregisters an application event handler. When the event handler is unregistered, the application will not receive asynchronous event notifications.

Parameters:

none

Return Codes:

A first code indicates that the operation was successfully completed.

A second code indicates that the media server has reported an error.

A third code indicates that the session handler is corrupt.

A fourth code indicates that the operation has failed.

Content Class Member Functions

Destage

Transfers a media object from the media server to the media archive.

This member function relies on other member functions. In particular, the member function calls the DELETE member function to delete a media object from the media archive if it exists, and then calls the COPY function to deliver the media object to the video archive.

Get_Media_Attribute

Obtains media attributes of a specified media object.

Parameters:

An indicator of a MEDIA_ATTRIBUTES structure. The MEDIA_ATTRIBUTES structure specifies the size of the structure, the play back rate in frames/sec, the play back rate in bits/sec, the expected number of users, the type of the media object, and the duration of the media object during playback.

Return Codes:

A first code indicates whether the operation was successfully completed.

A second code indicates whether the media server reported an error.

A third code indicates whether the operation has failed.

Get_Media_Status

Obtains a status of a media object.

Parameters:

An indicator of a MEDIA_STATUS structure to receive status information. The MEDIA_STATUS structure specifies the size of this structure, the current length (bytes), the media copy rate, the media open mode, the creation date, the date the media object was last modified, the date the media object was last accessed.

Return Codes:

A first code indicates whether the operation was successfully completed.

A second code indicates whether the media server reported an error.

A third code indicates whether the operation has failed.

Load

Copies an existing media object from a client to a media Server. The media object must be open in write mode. This member function is an asynchronous function, i.e., it returns after initiating the load operation. The progress of this member function can be determined by calling the GET_MEDIA_STATUS member function. However, the operation may be cancelled by calling the CLOSE member function.

Parameters:

An indicator of a MEDIA_ATTRIBUTES structure. The MEDIA_ATTRIBUTES structure defines the size of the structure, the type of the media object, the duration of the media object during playback, the play back rate in frames/sec, the playback rate in bits/sec, the expected number of users, and the name of the media object.

A host name from which media object(s) are transferred.

A user ID of the host specified by the hostname parameter.

A password of the user ID specified by the user ID parameter.

A file name array. All the files in the array can be joined together to form a single media object. This allows very large media objects to be created even if a particular media server does not support very large files.

A number of file names in the file name array.

An indicator of a MEDIA_STATUS structure used to receive status information. The MEDIA_STATUS specifies a size of the structure, the current length (bytes), the media object copy rate, a media object open mode, a creation date of the media object, the date that the media object was last modified, and the date that the media object was last accessed.

Return Codes:

A first code indicates whether the operation was successfully completed.

A second code indicates whether the media server reported an error.

A third code indicated that an invalid media server name has been specified.

A fourth code indicates that an invalid server name has been specified.

A fifth code indicates that the operation has failed.

A sixth code indicates that there is insufficient space available in Media Server.

A seventh code indicates that there is insufficient disk bandwidth in the media server.

Read

Reads data of a specified media object. Each successive call to the member function reads a sequential number of bytes from the current position. The media object must be open in read mode in order to call this member function.

Parameters:

An indicator of a pointer to which data is transferred.

A number of bytes to be read.

A number of bytes that have actually been read.

Return Codes:

A first code indicates whether the operation was successfully completed.

A second code indicates whether the media server reported an error.

A third code indicates that the operation has failed.

Retrieve

Retrieves a media object from the media server. This member function calls other member functions. In particular, the COPY member function is called if a media object is not already stored in the media server. Subsequently, the GET META_DATA member function is called to retrieve metadata information.

Seek

Sets a current byte position within the media object. This member function only works in conjunction with the READ member function. The media object must be open in read mode in order for the operation to be initiated. It has no effect during a write operation.

Parameters:

An indicator of how an offset parameter is used. The following support options may also be specified. A first support option sets a media byte position to the value of the offset parameter. A second support option sets the media byte position to its current position plus the offset parameter. A third support option sets the media byte position to the end of the media.

An indicator of the byte offset into the media object being read.

Return Codes:

A first code indicates whether the operation was successfully completed.

A second code indicates whether the media server reported an error.

A third code indicates that the operation has failed.

Set_Media_Attribute
  Sets the media attributes of a media object. The media object must be opened in write mode to employ this member function.
  Parameters:
  An indicator of a MEDIA_ATTRIBUTES structure. The MEDIA_ATTRIBUTES structure specifies the size of this structure, an attributes flag, the type of the media object, the duration of the media object, the play back rate in frames/sec, the play back rate in bits/sec, the expected number of users, and the name of the media object.
  The attributes flag is a bit mask built up using a combination of basic attribute flags. The basic attribute flags specify which values in the structure are being set. The basic asset attribute flags set the media object name, the media object type, the duration of the media object, the media object, frame rate, the media object bit rate, the expected number of users, and all the attributes of the media object.
  Return Codes:
  A first code indicates whether the operation was successfully completed.
  A second code indicates whether the media server reported an error.
  A third code indicates that the operation has failed.
Write
  Writes data to the media object. Each successive call to this member function writes a sequential number of bytes. The media must be open in write mode.
  Parameters:
  An indicator of a pointer from which data is written.
  A number of bytes to be written.
  A number of bytes that have actually been written.
  Return Codes:
  A first code indicates whether the operation was successfully completed.
  A second code indicates whether the media server reported an error.
  A third code indicates that the operation has failed.

What is claimed is:

1. A media manager which incorporates an application program interface (API) for converting high-level generic commands into device level commands for output to a plurality of media devices, said media manager comprising:
   a high-level command processor which decodes the high-level generic commands; and
   a plurality of device specific code mapping modules which convert the high-level generic commands by said high-level command processor into device level commands, each of the device-level commands being output from one of the plurality of device specific code mapping modules to a corresponding one of the plurality of media devices.

2. The media manager defined by claim 1, wherein said high-level command processor includes a plurality of individual APIs which correspond to the common API, the individual APIs each handling a specific function.

3. The media manager defined by claim 1, further comprising a device interface which receives each of the device level commands output from the plurality of device specific code mapping modules and outputs each of the device-level commands to a corresponding one of the plurality of media devices.

4. The media manager defined by claim 2, wherein said each of said media devices comprises a media archive and at least one media server, each of said media devices storing media objects.

5. The media manager defined by claim 4, wherein said media archive and media server are included in a multimedia data storage system including a digital library.

6. The media manager defined by claim 4, wherein said individual application program interfaces represent member functions associated with classes which define objects representing media servers and objects representing a logical description of a physical format of a media object.

7. The media manager defined by claim 1, wherein said plurality of device-specific code-mapping modules convert high-level generic commands into specific actions and convert the specific actions into device level commands.

8. A method of implementing an application program interface (API) for a plurality of media devices comprising:
   receiving a plurality of high-level generic commands from a computer application;
   converting the plurality of high-level generic commands into device-level commands; and
   outputting each of the device level commands to one of the media devices;
   wherein said converting comprises converting the plurality of high-level generic commands into specific actions, at least one of the plurality of high level commands being converted into a plurality of the specific actions; and
   converting the specific actions into device-level commands.

9. The method defined by claim 8, wherein said converting comprises converting the plurality of high-level generic commands using a plurality of individual APIs which each perform a specific function.

10. The method defined by claim 8, wherein each one of the high-level generic commands is received along with a media device type identifier;
    wherein prior to said converting, it is determined whether the media device type corresponds to one of the media devices; and
    wherein each of the device level commands is output to a corresponding one of the plurality of media devices which is of the media device type.

11. A computer program product including a computer-readable medium, comprising:
    means for decoding high-level generic commands;
    means for converting the high-level generic commands into device-level commands; and
    means for outputting each of the device-level commands to a corresponding media devices,
    wherein said means for converting converts high-level generic commands into specific actions and converts said specific actions into the device-level commands, and at least one of said high level commands is converted into a plurality of the specific actions.

12. A method of implementing an application program interface (API) for a plurality of media devices comprising:
    receiving a plurality of high-level generic commands from a computer application;
    converting the plurality of high-level generic commands into device-level commands; and
    outputting each of the device level commands to one of the media devices;

wherein each one of the high-level generic commands is received along with a media device type identifier;

wherein prior to said converting, it is determined whether the media device type corresponds to one of the media devices; and wherein each of the device level commands is output to a corresponding one of the plurality of media devices which is of the media device type.

13. The method defined by claim 12, wherein said converting comprises converting the plurality of high-level generic commands using a plurality of individual APIs which each perform a specific function.

14. The method defined by claim 12, wherein said converting comprises converting the plurality of high-level generic commands into specific actions; and converting the specific actions into device-level commands.

* * * * *